(12) United States Patent
Sankar

(10) Patent No.: US 7,689,907 B2
(45) Date of Patent: Mar. 30, 2010

(54) NETWORK ROUTER CONFIGURED FOR EXECUTING NETWORK OPERATIONS BASED ON PARSING XML TAGS IN A RECEIVED XML DOCUMENT

(75) Inventor: Krishna I. Sankar, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 826 days.

(21) Appl. No.: 11/412,862

(22) Filed: Apr. 28, 2006

(65) Prior Publication Data

US 2006/0200458 A1    Sep. 7, 2006

Related U.S. Application Data

(63) Continuation of application No. 09/921,780, filed on Aug. 6, 2001, now Pat. No. 7,065,706.

(51) Int. Cl.
    G06N 3/00    (2006.01)
(52) U.S. Cl. .................................................. 715/237
(58) Field of Classification Search ................. 715/234, 715/244, 254, 237
    See application file for complete search history.

(56) References Cited

U.S. PATENT DOCUMENTS

| | | | |
|---|---|---|---|
| 5,678,010 | A | 10/1997 | Pittenger et al. |
| 6,091,724 | A | 7/2000 | Chandra et al. |
| 6,732,175 | B1 | 5/2004 | Abjanic |
| 6,772,413 | B2 | 8/2004 | Kuznetsov |
| 2002/0198974 | A1 * | 12/2002 | Shafer .................. 709/223 |

OTHER PUBLICATIONS

Martin Gudgin, Marc Hadley, Jean-Jacques Moreau and Henrik Frystyk Neilsen, W3C®, SOAP Version 1.2, W3C Working Draft Jul. 9, 2001, 70 pgs.
IBM, "Thinking XML: XML meets semantics, Part 1", [online], Published Feb. 1, 2001, [retrieved on Jan. 29, 2009]. Retrieved from the Internet: <URL: http://www.ibm.com/developerworks/xml/library/x-think1.html>, pp. 1-4.
Marchal, "XML and Semantic", *XML by Example*, Dec. 1999, Chapter 2, p. 58 (3 pages total).

* cited by examiner

*Primary Examiner*—Kyle R Stork
(74) *Attorney, Agent, or Firm*—Leon R. Turkevich

(57) ABSTRACT

A router is configured for routing, via an open protocol network, a received message to a destination node based on parsing an XML portion within the received message. The router includes an XML parser configured for parsing XML tags specifying prescribed attributes, and an application resource configured for interpreting the prescribed attributes for a determined service based on runtime execution of the application resource. In particular, the runtime execution of the application resource provides application-specific syntax and semantics enabling interpretation of the parsed XML tags. The application resource, in response to interpreting the prescribed attributes, initiates selected application operations, including outputting the received message to a prescribed destination, based on the execution of the prescribed application operations.

37 Claims, 3 Drawing Sheets

NETWORK ROUTER CONFIGURED FOR EXECUTING NETWORK OPERATIONS BASED ON PARSING XML TAGS IN A RECEIVED XML DOCUMENT

This application is a continuation of application Ser. No. 09/921,780, filed Aug. 6, 2001 now U.S. Pat. No. 7,065,706.

BACKGROUND OF THE INVENTION

1. Field of the Invention

The present invention relates to a router in an open protocol network configured for executing network operations, for example routing requests and responses, for network nodes utilizing extensible markup language (XML) based messaging.

2. Description of the Related Art

Networking communications technology is undergoing substantial changes in an effort to provide a seamless integration of services by servers connected via a wide area network, such as the World Wide Web. Concerns, however, over scability, security, and fault-tolerance (i.e., "robustness") limit the ability to implement integration of services using existing protocols, such as Hypertext Markup Language (HTML). In particular, HTML specifies a limited set of prescribed tags for performing prescribed web operations: these tags cannot be modified absent adoption by The World Wide Web Consortium (W3C); hence, use of HTML is limited in its ability to provide advanced networking operations necessary for integration of services.

Extensible Markup Language (XML) enables developers to define application-specific attributes that can be interpreted by a computing system executing the corresponding application. In particular, XML enables a developer to specify an XML tag to have a specific attribute: the interpretation of that attribute (i.e., the attribute's "context") is determined by the application runtime environment of the corresponding application under execution.

Hence, XML provides substantial flexibility in defining application-specific attributes for a corresponding application under execution. Use of XML in providing enhanced communications in a distributed environment across a prescribed network has been recognized by the W3C, which has developed newer standards such as XHTML 1.0 and the XML Protocol. The XHTML 1.0 Standard is an enhancement to the 1977 HTML 4.0 Standard, enabling creation of richer web pages on different browser platforms including cell phones, televisions, cars, wallet sized wireless communicators, kiosks, and desktops.

The XML Protocol is intended to develop technologies which allow two or more peers to communicate in a distributed environment, using XML as its encapsulation language. The XML Protocol is intended to provide a layered architecture on top of an extensible and simple messaging format. The working group for the XML Protocol, known as the XML Protocol Working Group, is endeavoring to develop a framework for XML-based messaging systems, which includes specifying a message envelope format and a method for data serialization, directed mainly, but not exclusively, to Remote Procedure Call (RPC) applications.

Unfortunately, the full advantages of deploying XML based web pages and messages (hereinafter "XML documents") are limited by the relative inability of intermediate nodes such as routers to transfer the XML documents through a wide area network, such as the World Wide Web, according to the service requirements specified by the XML documents. In particular, routers currently route packets according to Internet Protocol, which specify only limited priority values such as an 8-bit Type of Service field. Hence, network nodes interacting based on XML documents still are limited in the services limitations of the intermediate routers on the wide area network that forward the packets carrying the data for the XML documents. Consequently, the XML based application services executed by the network nodes still are subject to dropped packets, latency issues, and encountering loss of service based on a network node failure.

SUMMARY OF THE INVENTION

There is a need for an arrangement that enables XML documents to be routed throughout an open protocol network in a manner that provides networking operations based on attributes specified in the XML documents.

There also is a need for an arrangement that enables messages to be routed through an open protocol network based on respective XML-based headers within the messages.

There also is a need for an arrangement that enables a router in an open protocol network to request services, based on execution of prescribed applications by remote nodes on the open protocol network, based on parsing a received XML document.

These and other needs are attained by the present invention, where a router is configured for routing, via an open protocol network, a received message to a destination node based on parsing an XML portion within the received message. The router includes an XML parser configured for parsing XML tags specifying prescribed attributes, and an application resource configured for interpreting the prescribed attributes for a determined service based on runtime execution of the application resource. In particular, the runtime execution of the application resource provides application-specific syntax and semantics enabling interpretation of the parsed XML tags. The application resource, in response to interpreting the prescribed attributes, initiates selected application operations, including outputting the received message to a prescribed destination, based on the execution of the prescribed application operations.

Hence, the router is able to determine context for XML tags within an XML portion of a received message in order to select application operation to be performed, based on the context established during runtime execution of the application resource. The context may be determined, for example, based on identifying relevant attributes such as security attributes, quality of service attributes, connection attributes (e.g., synchronous or asynchronous), or destination attributes that may specify alternate destinations based on respective determined performance attributes. Moreover, the establishment of application-specific syntax and semantics for interpretation of the parsed XML tags enables the router to establish an increased "vocabulary" as additional application resources are added; hence, the router can implement new application operations for enhanced services as they are developed.

One aspect of the present invention provides a router configured for forwarding a received message. The router includes a network interface configured for receiving the received message from a source node, and forwarding the received message to a destination node, via an open protocol network, according to selected application operations. The router also includes an extensible markup language (XML) parser configured for parsing XML tags from a portion of the received message, the XML tags specifying prescribed attributes, and an application resource. The application resource is configured for interpreting the prescribed attributes from the XML tags based on runtime execution of the application resource. The application resource initiates the selected application operations for routing the received message to the destination node. Hence, messages can be routed by the router based on attributes determined from parsing XML portions (e.g., XML envelopes, XML headers, etc.) within the messages, enabling determination of content-based routing attributes, for example quality of service-based routing, document type-based routing, security-based or services-based routing relative to the desired destinations, etc.

Another aspect of the present invention provides a method in a router of forwarding a received message. The method includes receiving the received message from a source node via an open protocol network, parsing XML tags from a portion of the received message, the XML tags specifying prescribed attributes, and initiating selected application operations for routing the received message based on interpreting the prescribed attributes from the XML tags according to runtime execution of an application resource. The method also includes selectively outputting the received message to a destination node based on the selected application operations.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
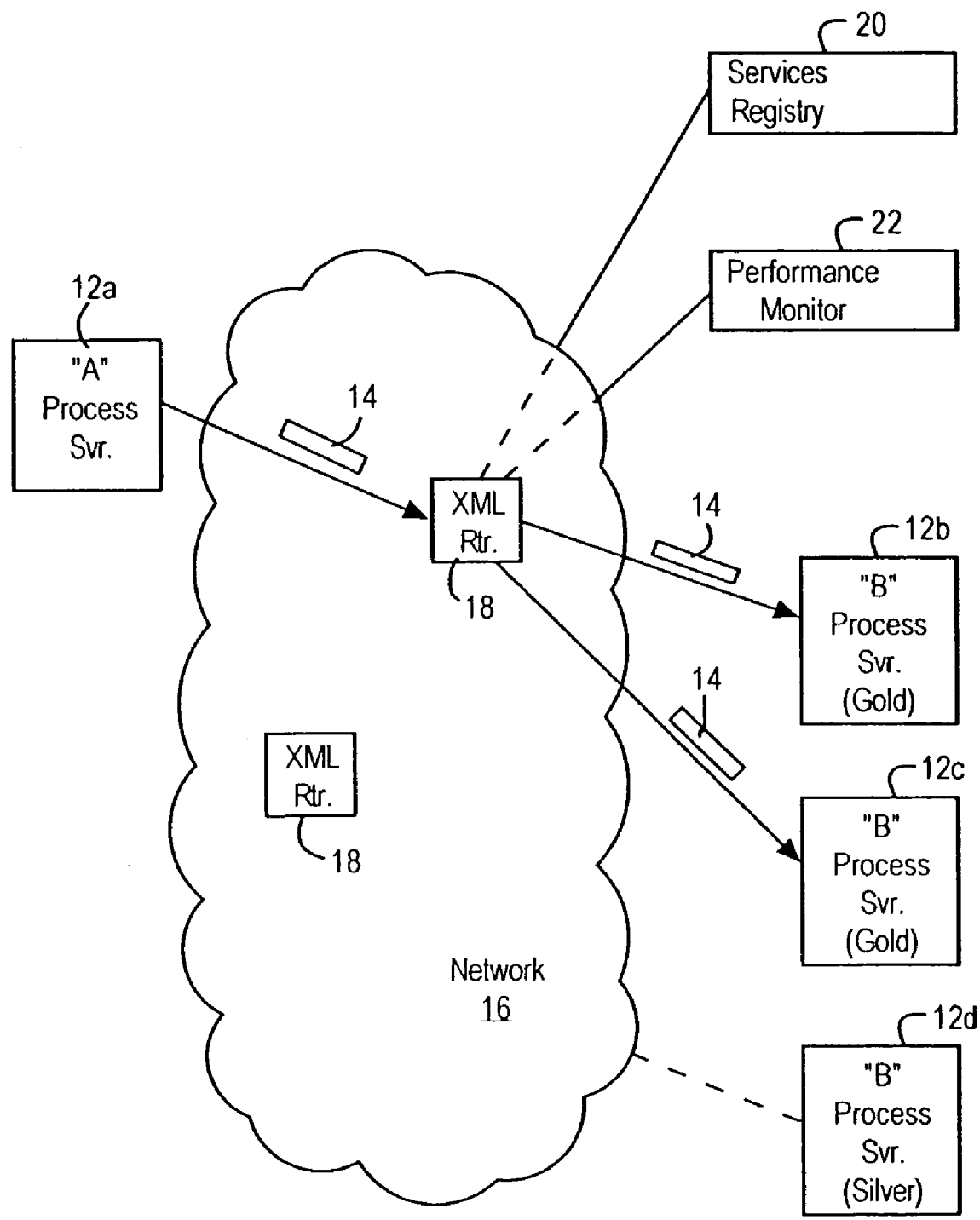
FIG. 1 is a block diagram illustrating a system for providing content-based routing of messages based on interpreting extensible markup language (XML) portions, according to an embodiment of the present invention.

FIG. 1 is a block diagram illustrating a system 10 for providing a network based integration of distributed services based on transfer of extensible markup language (XML) based messages 14 between network nodes, according to an embodiment of the present invention. In particular, FIG. 1 illustrates process servers 12 configured for providing prescribed services based on exchange of XML based messages between each other. For example, the process server 12a may be configured for providing prescribed business services for a first business entity "A", whereas the process servers 12b, 12c, and 12d may be configured for providing respective prescribed business services for a second business entity "B", where the first and second business entities "A" and "B are business partners (e.g., supplier and business consumer) providing computer based business transactions across a prescribed open protocol network 16.

As described above with respect to the background of the invention, XML based forms and messages have heretofore been considered in the context of peer to peer communications, for example between two computers exchanging information services. However, problems arise if one attempts to provide XML based services using geographically dispersed services or distributed processes.

According to the disclosed embodiment, the open protocol network 16 includes an XML message router 18 configured for providing content based application operations for routing received messages 14 to destination nodes, such as the process servers 12. In particular, the disclosed XML message router 18 enables evolving XML standards, such as those under development by the World Wide Web Consortium, to be applied in a network-based arrangement that enables integration of XML based services across a network. Examples of services utilizing XML supported by the message router 18 include XML linking language (XLink), XML Encryption, XForms, XHTML, XML Base, XML Query, XML Schema, XML Signature, XPath, XPointer, XSL and XSLT. Additional details of these XML based services can be located on the World Wide Web at the World Wide Web Consortium's web page, located at www.w3c.org. In addition, the XML message router 18 can implement XML based protocols such as SOAP, ebXML, or Rosettanet, described below.

As described below, the XML message router 18 identifies required attributes of the XML message 14, based on parsing XML tags within the XML message 14, in order to reach a routing decision. The XML tags may be arranged in different forms, referred to as an "envelope" (e.g., in SOAP protocol), or a "header", etc. The XML message router 18 interprets the required attributes based on recognized syntax and semantics rules resident within the application runtime environment of the XML message router 18, and obtains any necessary routing information from external sources to determine the necessary routing attributes for forwarding the XML message 14. Depending on the routing attributes, the XML message router 18 may output the XML message 14 to selected destinations, redirect the XML message 14 to an alternate destination, for example due to quality of service or security requirements, or direct a remote service to initiate another application operation necessary for the XML message 14.

Hence, the disclosed XML message router 18 enables XML based applications to be applied in routing messages across a network, as opposed to merely providing enhanced communication services between XML peer applications at the end points of the network. Hence, interoperability of application operations is no longer limited to the intersection of features and service supported by two or more communicating peers, but rather can be extended to the integration of multiple features and services among multiple process services distributed across multiple network nodes and reachable by the XML message router 18.

The integration of multiple features and services among multiple process services distributed across multiple network nodes is accomplished based on registering the services provided by the process servers with a services registry 20, configured for storing services information and attributes for the services provided by the respective process server 12. Although the operations of the services registry 20 also can be integrated within the XML message router 18, for the purposes of this description the operations are separated for simplicity. Hence, each process server 12, during initialization, outputs an XML based registration message; the registration message, intercepted by the router 18, parses the XML information and registers the initialized process server 12 with the services registry 20. Registration information may include the type of message the corresponding process server 12 will handle, quality of service capabilities, security authorization for client side requests and security requirements for server side operations, etc. The router 18, upon completing registration with the services registry 20, also may return an XML based registration acknowledgment message specifying that registration is complete, enabling the corresponding process server 12 to begin providing the prescribed services.

Once a process server 12 has registered, quality of service metrics may be measured by a performance monitor 22, independently or in response to requests from the router 18. Hence, the router 18 can manage the registration of process servers 12, monitor process servers 12 for quality of services, and selectively route messages based on type of service requested, quality of service requirements, security requirements, etc.

Figure 2:
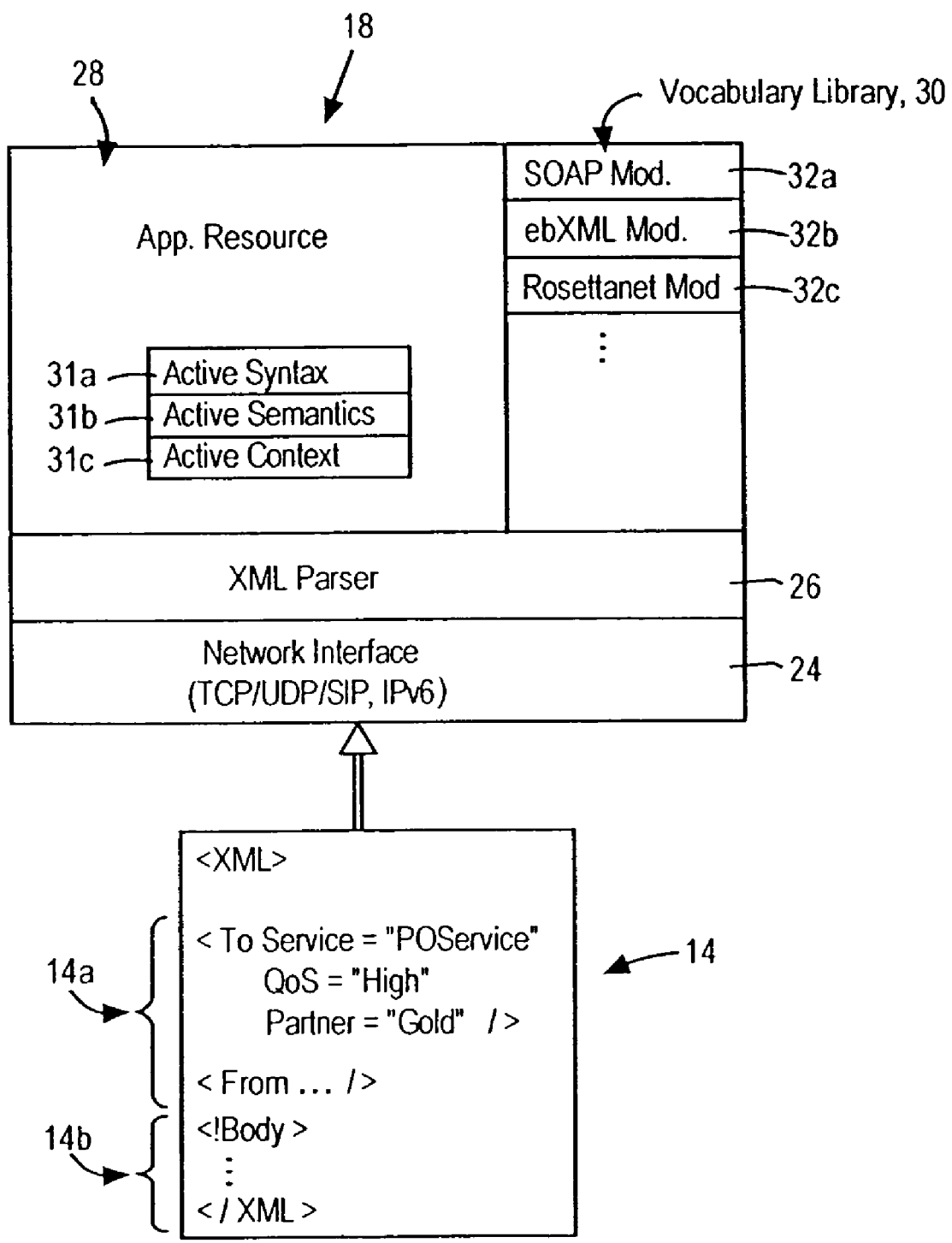
FIG. 2 is a diagram illustrating in detail the XML-enabled router of FIG. 1 according to an embodiment of the present invention.

FIG. 2 is a diagram illustrating in detail the XML based router 18 of FIG. 1 according to an embodiment of the present invention. The router 18 includes a network interface 24 configured for receiving the XML based message from a source node such as the process server 12a, and forwarding the message 14 to a destination node according to selected application operations, described below. The network interface 24 operates according to prescribed open network protocols, for example TCP, UDP, or IPv6.

The router 18 also includes an XML parser 26, an executable application resource 28, and a vocabulary library 30. The XML parser 26 is configured for parsing XML tags from the header 14a of the received message 14. The term "header", as used in the specification, refers to the portion of the XML-based message 14 containing the XML tags necessary for the router 18 to determine the appropriate routing attributes. In particular, the header 14a specifies tags that specify prescribed attributes; for example, the header 14a may specify a destination in the form of a "To" field that specifies destination attributes based on the requested service (e.g., "POService" for purchase order service), the required quality of service (measured, for example, in terms of latency), and security or other prescribed attribute (e.g., partner equals "Gold" indicating a prescribed level of service for the "Partner" attribute). The body 14b of the XML message 14 includes metatags for the service at the message destination.

The application resource, executable by the router 18, is configured for interpreting the attributes parsed by the parser 26. In particular, the application resource 28, implemented for example as an application runtime environment, is configured for interpreting XML tags based on context-specific information relative to the service requested by the source node 12a, the attributes and state of the source node 12a, the attributes and state of potential destination nodes, etc. In addition, the application resource 28 maintains within its application runtime environment rules that are used to interpret the attributes, including syntax rules 31a (specifying the format and logic for the parsed XML tags), semantics rules 31b (specifying definitions and attributes for XML tag names and attribute names and variables within the header 14a), and context information 31c (specifying state variables for relevant attributes specified within the header 14a and/or required by the application resource 28 to select routing operations). Hence, the application resource 28 is configured for interpreting the prescribed attributes from the XML header 14a based on syntax and semantics information used by the application run time environment 28 to interpret the tags, followed by the evaluation of context—specific information 31c for selecting routing application operations.

The router also includes a vocabulary library 30 having vocabulary modules 32. Each vocabulary module specifies the prescribed syntax and semantics information for a corresponding group of XML tags that specifies an XML based protocol, service, etc. For example, the vocabulary module 32a specifies the prescribed syntax and semantics information enabling the application resource 28 to interpret XML tags used for a message "envelope" (required) and a message "header" (optional) according to SOAP Version 1.2, published by the World Wide Web Consortium. The vocabulary module 32b is configured for storing prescribed syntax and semantics information for XML tags for use in performing operations according to ebXML, published by the United Nations Centre for Trade Facilitation and Electronic Business (UN/CEFACT), and described on the World Wide Web at the ebXML web page, located at www.ebxml.org. The vocabulary module 32c is configured for specifying syntax and semantics information for XML tags used to specify operations according Rosettanet protocol. Additional details regarding Rosettanet protocol can be located on the World Wide Web at the Rosettanet web page, located at www.rosettanet.net.

Hence, the vocabulary 30 is configured for storing vocabulary modules 32 that enable the application resource 28 to interpret the prescribed attributes specified by the XML tags within the message 14. If an XML header 14a includes tags that are not recognized by the application resource 28, the application resource 28 may issue a request to an external source, for example the services registry 20, for retrieval of the appropriate vocabulary module 32 for interpretation of the XML tags.

Figure 3:
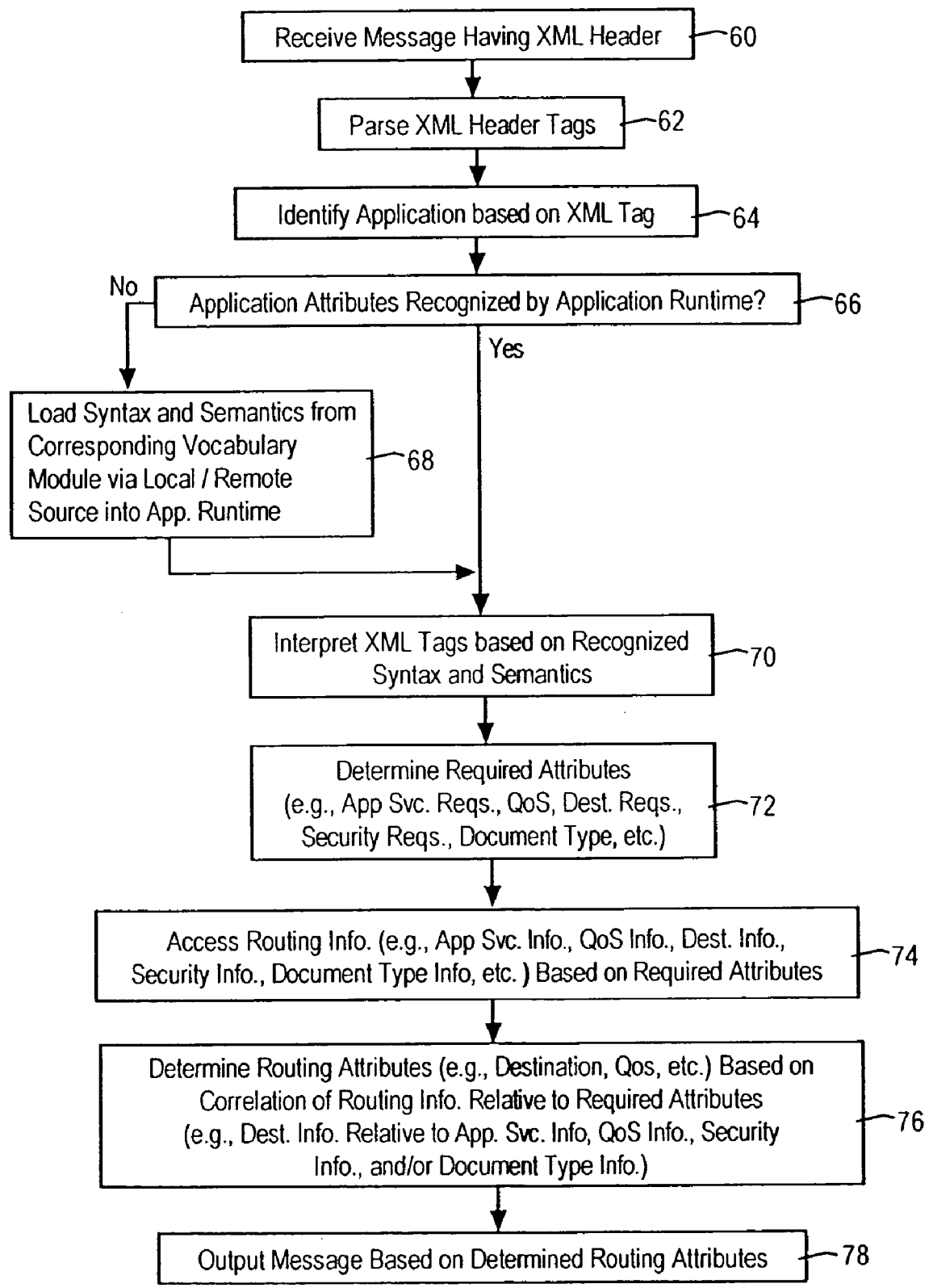
FIG. 3 is a diagram illustrating the method of providing content-based routing of messages based on interpreting XML portions, according to an embodiment of the present invention.

FIG. 3 is a diagram illustrating the method of forwarding a received message based on parsing and interpreting XML tags and initiating selected application operations for routing the received message based on the parsed XML tags, according to an embodiment of the present invention. The steps described in FIG. 3 can be implemented as executable code stored on a computer readable medium (e.g., a hard disk drive, a floppy drive, a random access memory, a read only memory, an EPROM, a compact disc, etc.).

The method begins in step 60, where the router 18 receives the message 14 having the XML portion 14a specifying tags necessary for performing a routing decision. The XML parser 26 parses in step 62 the XML tags from the portion 14a in step 62, enabling the application resource 28 to identify the application service in step 64 (e.g., SOAP, ebXML, Rosettanet, etc.) based on the XML tag.

If in step 66 the application attributes are not recognized by the application runtime environment maintained by the application resource 28, the application resource 28 loads the syntax and semantics information from the corresponding vocabulary module 32 in step 68; alternately, the application resource 28 may send a request to a remote source, for example the services registry 20, requesting transfer of the appropriate vocabulary module 32 for the identified application. Once the appropriate syntax information 31a and semantics information 31b have been loaded into application run time, the application resource 28 interprets in step 70 the XML tags based on the recognized syntax and semantics, and if necessary the context information 31c specifying relevant state variables.

The application resource 28 then determines the required attributes in step 72 that are needed to select the application operations to be initiated for routing the received message. For example, the application runtime environment 28 may determine that prescribed application services are required (e.g., a prescribed service requirement), a prescribed quality of service is required, for example that can guarantee a prescribed minimum latency or ensure a prescribed guaranteed bandwidth, or guaranteed a response within a prescribed maximum time interval, etc. Destination requirements also may be specified in terms of network topology, geographic location, corresponding prescribed services, or destination identity (e.g., the partner attribute having a "gold" destination), etc. Any security requirements also may be determined as well as determining whether the document type specified within the portion 14a have specified the manner in which the message 14 is routed.

Once the application resource 28 identifies the required attributes in step 72 the application resource 28 accesses the routing information, locally or remotely, based on the required attributes. For example, the application resource 28 may access via the network an information services registry 20 for application services information based on parsing an XML tag specifying an application services requirement; the application services information may specify the quality of service information as determined by the performance monitor, etc. The application resource 28 also may access security information, for example for a services registry 20, for example in the form of a hierarchal list of destinations having respective security protocols and authorizations. The application resource 28 also may access destination information and/or document type information that specify multiple destination nodes capable of providing the necessary services relevant to the prescribed destination information, and/or document type. For example, the process servers 12b, 12c, and 12d each may be a member of an attribute related to a purchase order service, whereas only process servers 12b and 12c are configured as "Gold services", or alternately only process servers 12b and 12c are configured for a prescribed document type, for example receipt of new purchase orders, whereas the process server 12d typically is configured for order tracking, and cannot process incoming new orders.

Based on the accessed routing information, the application resource 28 determines in step 74 the routing attributes, including destination nodes, quality of service required, etc. based on a correlation of the routing information obtained by the application resource 28, relative to the required attributes specified during interpretation of the XML tags within the header 14a by the application run time environment. Based on the determined routing attributes, the application resource 28 outputs the message 14 based on the determined routing attributes in step 78, enabling the network interface 24 to output the message to the specified destinations and according to the specified quality of service, XML-based protocol, security, etc. Note that the application resource 28 resolves the destination based on prescribed application services; hence, the XML-based router 18 resolves the set of attributes and requirements enabling the intelligent routing of the XML based message 14 to the appropriate destination. The router would also add a path to the header portion 14a, providing context for subsequent XML processing, as needed.

According to the disclosed embodiment, an XML based router enables network wide integration of services providing prescribed business functions, based on dynamic selection of prescribed application operations for routing the received message to the appropriate destination nodes. Hence, the router can operate as an intermediary or as an arbiter of distributed application services, providing functions such as including initiating requests for initiation of remote services; requesting that process servers be suspended for identified services if necessary; dynamically monitor the performance of the routing system and execute corrective procedures as necessary; and provide policy based authorization for security of sensitive applications.

Hence, the dynamic processing of XML tags by the XML based router 18 enables integration of services in a distributed, geographically dispersed network.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A network router configured for forwarding a received message, the network router comprising:
a network interface configured for receiving the received message from a source node, and forwarding the received message to a destination node, via an open protocol network, according to selected application operations;
an extensible markup language (XML) parser configured for parsing XML tags from a portion of the received message, the XML tags specifying prescribed attributes including application-specific attributes; and
an application resource configured for interpreting the prescribed attributes from the XML tags based on establishing context for interpreting the XML tags during runtime execution of the application resource, the application resource initiating the selected application operations for routing the received message to the destination node based on the interpreting.

2. The network router of claim 1, wherein the application resource is configured for interpreting the prescribed attributes based on retrieval of prescribed syntax and semantics information.

3. The network router of claim 2, wherein the application resource is configured for accessing, as one of the selected application operations, prescribed attribute information from a server providing information services via the open protocol network, the prescribed attribute information used for routing the received message.

4. The network router of claim 3, wherein the application resource accesses application services information as the prescribed attribute information based on parsing an XML tag specifying an application services requirement.

5. The network router of claim 4, wherein the application services information specifies quality of service information, the network router configured for routing the received message based on the quality of service information.

6. The network router of claim 5, wherein the application resource is configured for accessing destination information based on parsing an XML tag specifying a destination requirement.

7. The network router of claim 6, wherein the open protocol network is an Internet Protocol network.

8. The network router of claim 6, wherein the application resource is configured for selecting the destination node based on correlating the destination information with the quality of service information.

9. The network router of claim 3, wherein the application resource is configured for accessing security information from the server based on parsing an XML tag specifying a security requirement, the application resource configured for selectively routing the received message based on the accessed security information.

10. The network router of claim 9, wherein the application resource is configured for accessing destination information based on parsing an XML tag specifying a destination requirement, the destination information specifying multiple destination nodes, the application resource configured for selectively routing the received message to authorized ones of the destination nodes based on the accessed security information.

11. The network router of claim 3, wherein the application resource is configured for accessing destination information based on parsing an XML tag specifying a document type, wherein the prescribed syntax and semantics information specifies respective destinations for respective document types, the application resource configured for determining the destination node based on the destination information and the document type.

12. The network router of claim 11, wherein the application is configured for retrieving quality of service information for available destinations, the network router configured for determining the destination node based on the received quality of service information and the document type.

13. A method in a network router of forwarding a received message, the method comprising:
receiving, by the network router, the received message from a source node via an open protocol network;
parsing, by the network router, XML tags from a portion of the received message, the XML tags specifying prescribed attributes including application-specific attributes;
initiating, by the network router, selected application operations for routing the received message based on interpreting the prescribed attributes from the XML tags based on the network router establishing context for interpreting the XML tags during runtime execution of an application resource; and
selectively outputting the received message by the network router to a destination node based on the selected application operations.

14. The method of claim 13, wherein the initiating step includes interpreting the prescribed attributes based on retrieval of prescribed syntax and semantics information.

15. The method of claim 14, wherein the initiating step includes accessing the prescribed attribute information from a server providing information services via the open protocol network, and determining routing attributes based on the prescribed attribute information.

16. The method of claim 15, wherein the accessing step includes accessing application services information as the prescribed attribute information based on parsing an XML tag specifying an application services requirement.

17. The method of claim 16, wherein the determining step includes determining the routing attributes based on quality of service information specified within the application services information.

18. The method of claim 17, wherein the accessing step includes accessing destination information based on parsing an XML tag specifying a destination requirement.

19. The method of claim 18, wherein the open protocol network is an Internet Protocol network.

20. The method of claim 18, wherein the determining step includes selecting the destination node based on correlating the destination information with the quality of service information.

21. The method of claim 15, wherein the accessing step includes accessing security information from the server based on parsing an XML tag specifying a security requirement, the determining step including selectively routing the received message based on the accessed security information.

22. The method of claim 21, wherein the accessing step further includes accessing destination information based on parsing an XML tag specifying a destination requirement, the destination information specifying multiple destination nodes, the selectively routing step including forwarding the received message to authorized ones of the destination nodes based on the accessed security information.

23. The method of claim 15, wherein the accessing step includes accessing destination information based on parsing an XML tag specifying a document type, wherein the prescribed syntax and semantics information specifies respective destinations for respective document types, the determining step including identifying the destination node based on the destination information and the document type.

24. The method of claim 23, wherein the accessing step further includes retrieving quality of service information for available destinations, the determining step including identifying the destination node based on the received quality of service information and the document type.

25. A computer readable medium having stored thereon sequences of instructions for forwarding a received message by a network router, the sequences of instructions including instructions for performing the steps of:
receiving, by the network router, the received message from a source node via an open protocol network;
parsing, by the network router, XML tags from a portion of the received message, the XML tags specifying prescribed attributes including application-specific attributes;
initiating, by the network router, selected application operations for routing the received message based on interpreting the prescribed attributes from the XML tags based on the network router establishing context for interpreting the XML tags during runtime execution of an application resource; and
selectively outputting the received message by the network router to a destination node based on the selected application operations.

26. The medium of claim 25, wherein the initiating step includes interpreting the prescribed attributes based on retrieval of prescribed syntax and semantics information.

27. The medium of claim 26, wherein the initiating step includes accessing the prescribed attribute information from a server providing information services via the open protocol network, and determining routing attributes based on the prescribed attribute information.

28. The medium of claim 27, wherein the accessing step includes accessing application services information as the prescribed attribute information based on parsing an XML tag specifying an application services requirement.

29. The medium of claim 28, wherein the determining step includes determining the routing attributes based on quality of service information specified within the application services information.

30. The medium of claim 29, wherein the accessing step includes accessing destination information based on parsing an XML tag specifying a destination requirement.

31. The medium of claim 30, wherein the open protocol network is an Internet Protocol network.

32. The medium of claim 30, wherein the determining step includes selecting the destination node based on correlating the destination information with the quality of service information.

33. The medium of claim 27, wherein the accessing step includes accessing security information from the server based on parsing an XML tag specifying a security requirement, the determining step including selectively routing the received message based on the accessed security information.

34. The medium of claim 33, wherein the accessing step further includes accessing destination information based on parsing an XML tag specifying a destination requirement, the destination information specifying multiple destination nodes, the selectively routing step including forwarding the received message to authorized ones of the destination nodes based on the accessed security information.

35. The medium of claim 27, wherein the accessing step includes accessing destination information based on parsing an XML tag specifying a document type, wherein the prescribed syntax and semantics information specifies respective destinations for respective document types, the determining step including identifying the destination node based on the destination information and the document type.

36. The medium of claim 35, wherein the accessing step further includes retrieving quality of service information for available destinations, the determining step including identifying the destination node based on the received quality of service information and the document type.

37. A network router configured for forwarding a received message, the network router comprising:
 means for receiving the received message from a source node via an open protocol network;
 means for parsing XML tags from a portion of the received message, the XML tags specifying prescribed attributes including application-specific attributes;
 means for initiating selected application operations for routing the received message based on interpreting the prescribed attributes from the XML tags based on establishing context for interpreting the XML tags during runtime execution of an application resource; and
 means for selectively outputting the received message to a destination node based on the selected application operations.

* * * * *